(12) United States Patent
Mizukawa et al.

(10) Patent No.: US 7,331,176 B1
(45) Date of Patent: Feb. 19, 2008

(54) TRANSAXLE

(75) Inventors: Katsumoto Mizukawa, Hyogo (JP); Masaru Iida, Hyogo (JP); Donald Wieber, Morristown, TN (US)

(73) Assignees: Kanzaki Koyukoki Mfg. Co., Ltd., Hyogo (JP); Tuff Torq Corporation, Morristown, TN (US)

( * ) Notice: Subject to any disclaimer, the term of this patent is extended or adjusted under 35 U.S.C. 154(b) by 75 days.

(21) Appl. No.: 11/108,901

(22) Filed: Apr. 19, 2005

(51) Int. Cl.
*F16D 39/02* (2006.01)

(52) U.S. Cl. .............................. 60/442; 60/454; 60/487

(58) Field of Classification Search .................. 60/487, 60/442, 454
See application file for complete search history.

(56) References Cited

U.S. PATENT DOCUMENTS

| | | | | |
|---|---|---|---|---|
| 5,314,387 A | * | 5/1994 | Hauser et al. | 60/487 |
| 5,335,496 A | * | 8/1994 | Azuma et al. | 60/487 |
| 5,495,712 A | * | 3/1996 | Yano et al. | 60/487 |
| 5,809,845 A | * | 9/1998 | Shimizu | 60/454 |
| 6,109,033 A | * | 8/2000 | Folsom et al. | 60/487 |
| 6,382,148 B1 | * | 5/2002 | Maeyama et al. | 60/454 |
| 6,508,059 B1 | | 1/2003 | Takada et al. | |
| 6,682,453 B1 | | 1/2004 | Okada et al. | |

* cited by examiner

*Primary Examiner*—F. Daniel Lopez
(74) *Attorney, Agent, or Firm*—Sterne, Kessler, Goldstein & Fox P.L.L.C.

(57) ABSTRACT

With regard to a transaxle comprising a housing, which houses a hydrostatic stepless transmission constructed by fluidly connecting a hydraulic pump with a hydraulic motor and an axle drivingly connected to the transmission, the housing is constructed by detachably joining a first housing element with a second housing element through a joint surface in parallel to the lengthwise direction of the axle, a counter shaft, drivingly interposed between the hydrostatic stepless transmission and the axle in the housing, is located its axis in the first housing element, a leg member is engaged with the first housing element, and one of ends of the leg member is engaged with a part of the counter shaft, and the other end of the leg member is engaged with the second housing element so as not to be movable.

11 Claims, 14 Drawing Sheets

TRANSAXLE

BACKGROUND OF THE INVENTION

1. Field of the Invention

The present invention relates to a transaxle having a hydrostatic stepless transmission (hereafter, referred to as "HST") therein, the HST being constructed by fluidly connecting a hydraulic pump with a hydraulic motor.

2. Related Art

As disclosed in U.S. Pat. Nos. 6,508,059 and 6,682,453, conventionally, there is a well-known transaxle called as "IHT" (integral hydrostatic transaxle) comprising a housing incorporating an HST and an axle drivingly connected to the HST. The HST includes mutually fluidly connected hydraulic pump and motor.

In the transaxle of the U.S. Pat. No. '059, a motor shaft of a hydraulic motor, axles, and a counter shaft constituting a deceleration gear train interposed between the motor shaft and the axles are disposed horizontally in parallel, and are sandwiched between extended parts of upper and lower housing elements through respective bearing bushes. Since mutually meshing gears are disposed on the shafts and axles, alignment (axial location) of the shafts and axles in the housing of the transaxle requires high accuracy, thereby requiring highly elaborate and expensive processing of the housing. Furthermore, both the upper and lower housing elements requires elaboration in processing to sandwich the shafts and axles therebetween and to be joined to each other. Therefore, it is desirable for easing assembly of the transaxle and reducing cost thereof to ensure efficient and accurate alignment of the shafts with easy construction of the housing.

Moreover, with regard to the transaxle of the U.S. Pat. No. '059, the HST is immersed in an oil sump in the housing. A center section of the HST is formed at the bottom thereof with a charge port opened to the oil sump, and an oil filter for filtering oil to the charge port is sandwiched between the bottom surface of the center section and the housing. The oil filter requires sure oil sealing between the oil filter and the bottom surface of the center section or between the oil filter and the housing. An oil seal disclosed in the U.S. Pat. No. '059 is just sandwiched between the oil filter and the bottom surface of the center section, and is not engaged integrally with the oil filter, thereby complicating assembling thereof. If the oil filter has an oil seal previously fitted thereto, labor for the assembly is reduced so as to reduce the cost.

Furthermore, with regard to the U.S. Pat. No. '059, a brake disc is provided at the tip of the motor shaft of the hydraulic motor, and a brake mechanism is provided in the housing so as to brake the brake disc. An arm for actuating a cam of the brake mechanism is disposed out of the housing and pivotally supported on a wall of the housing. The arm is switched between a braking position and a braking-off position, and at each position, the arm is fixed by a stopper provided near the arm. The arm is biased toward the braking-off position by a spring or the like. However, the positional relation between the braking position and the braking-off position becomes different according to difference of transaxles. Therefore, it is necessary to change the position and structure of the stopper and spring following the difference of the positional relation. Standardization of attachment structure of the brake arm regardless of different positional relation between the braking position and the braking-off position is desirable for reducing the parts count and cost.

SUMMARY OF THE INVENTION

An object of the present invention is to provide an economic transaxle improved in standardization and assembling, the transaxle being constructed so that an HST, including mutually fluidly connected hydraulic pump and motor, and an axle drivingly connected to the HST are disposed together in a housing.

To achieve the object, a transaxle according to the present invention comprises: a hydrostatic stepless transmission including mutually fluidly connected hydraulic pump and motor; an axle drivingly connected to the hydrostatic stepless transmission; a housing incorporating the hydrostatic stepless transmission and the axle, the housing including first and second divisional housing elements joined to each other through a joint surface in parallel to the lengthwise direction of the axle; a counter shaft drivingly interposed between the hydrostatic stepless transmission and the axle in the housing, the counter shaft having an axis located in the first housing element; and a leg member engaged with the first housing element. One of ends of the leg member is engaged with a part of the counter shaft, and the other end of the leg member is immovably engaged with the second housing element. Accordingly, with regard to the first and second housing elements of the housing, accuracy for alignment of the counter shaft is required in only processing of the first housing element. The only required thing of the second housing element for arrangement of the counter shaft is to be processed for immovably engaging with the leg member. Therefore, the accuracy in processing of the second housing element is reduced so as to reduce the manufacturing cost of the housing.

Further, preferably, the hydraulic motor has a motor shaft. The motor shaft and the axle are supported so as to have axes of the motor shaft and the axle located by the first housing element. The first housing element defines a distance between the counter shaft and the motor shaft and a distance between the counter shaft and the axle. Accordingly, the motor shaft, the axle and the counter shaft can be easily aligned (axially located) on the first housing element simultaneously, thereby improving the transaxle in assembling facility and cost reduction.

To achieve the object, a transaxle according to the present invention comprises: a housing; a hydrostatic stepless transmission disposed in the housing, the hydrostatic stepless transmission including a component element; an axle disposed in the housing and drivingly connected to the hydrostatic stepless transmission; and a substantially cup-like shaped oil filter immovably sandwiched between the component of the hydrostatic stepless transmission and an inner surface of the housing. The oil filter comprises: a first opening facing to the component element of the hydrostatic stepless transmission; a groove formed at an edge part of the oil filter around the first opening; and a second opening provided on a peripheral surface of the oil filter. A seal member is engaged into the groove so as to be interposed between the oil filter and the component element of the HST. The second opening is covered with a net. Therefore, due to the groove formed in the oil filter, the seal member to be interposed between the oil filter and the component element of the HST can be previously fitted in the oil filter so as to facilitate assembling of the oil filer into the housing of the transaxle.

Further, the oil filter further comprises: a third opening facing to the inner surface of the housing; and a second groove formed at an edge part around the third opening. A seal member is engaged into the second groove so as to be interposed between the inner surface of the housing and the oil filter. Therefore, the seal member to be interposed between the oil filter and the inner surface of the housing can be previously fitted in the oil filter so as to facilitate assembling of the oil filer into the housing of the transaxle.

To achieve the object, a transaxle according to the present invention comprises: a housing; a hydrostatic stepless transmission disposed in the housing; an axle disposed in the housing and drivingly connected to the hydrostatic stepless transmission; a brake disposed in the housing so as to brake the axle; an arm rotatably supported by the housing so as to operate the brake, wherein the brake is turned into a braking state by setting the arm to a braking position, and wherein the brake is released by setting the arm to a braking-off position; and a first stopper for holding the arm at the braking-off position. The housing is provided thereon with two positions for attachment of the first stopper. One of the two positions is selected for attaching the first stopper to the housing depending upon which of opposite directions is selected for rotating the arm from the braking-off position to the braking position. Therefore, the housing can have a structure for attachment of the stopper thereto, which has not to be changed depending on which direction the arm is rotated in, thereby being standardized so as to reduce cost of the transaxle.

Further, the arm is provided with a torsion spring and a second stopper. The torsion spring biases the arm disposed at the braking position toward the braking-off position. The second stopper is attached to the arm. One of ends of the torsion spring is fixed to the first stopper attached to the housing, and the other end of the torsion spring is fixed to the second stopper. Therefore, a structure for biasing the arm to the braking-off position is also standardized so as to reduce cost of the transaxle.

These, other and further objects, features and advantages of the invention will appear more fully from the following description taken in connection with the accompanying drawings.

DETAILED DESCRIPTION OF THE INVENTION

Figure 1:
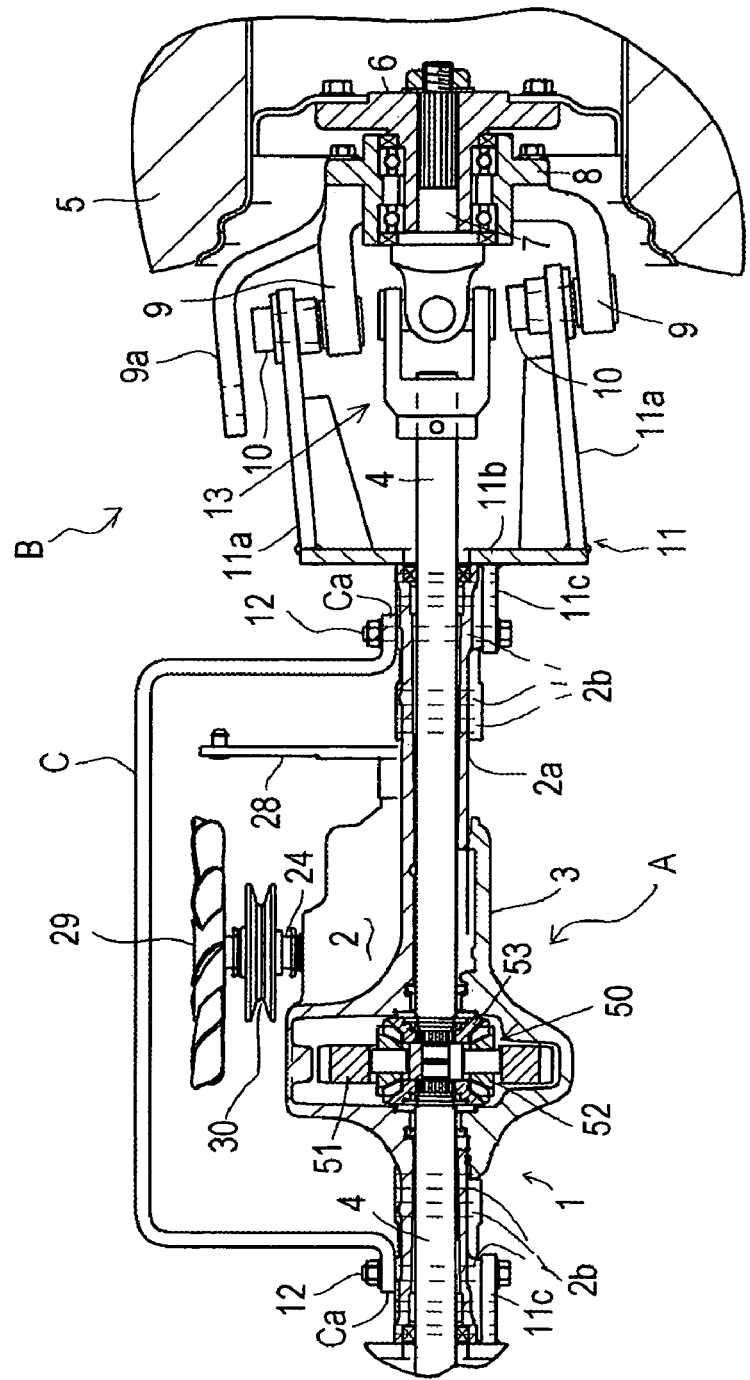
FIG. 1 is a sectional front view of a transaxle A connected to steerable wheel support units B and a vehicle frame C.
Figure 2:
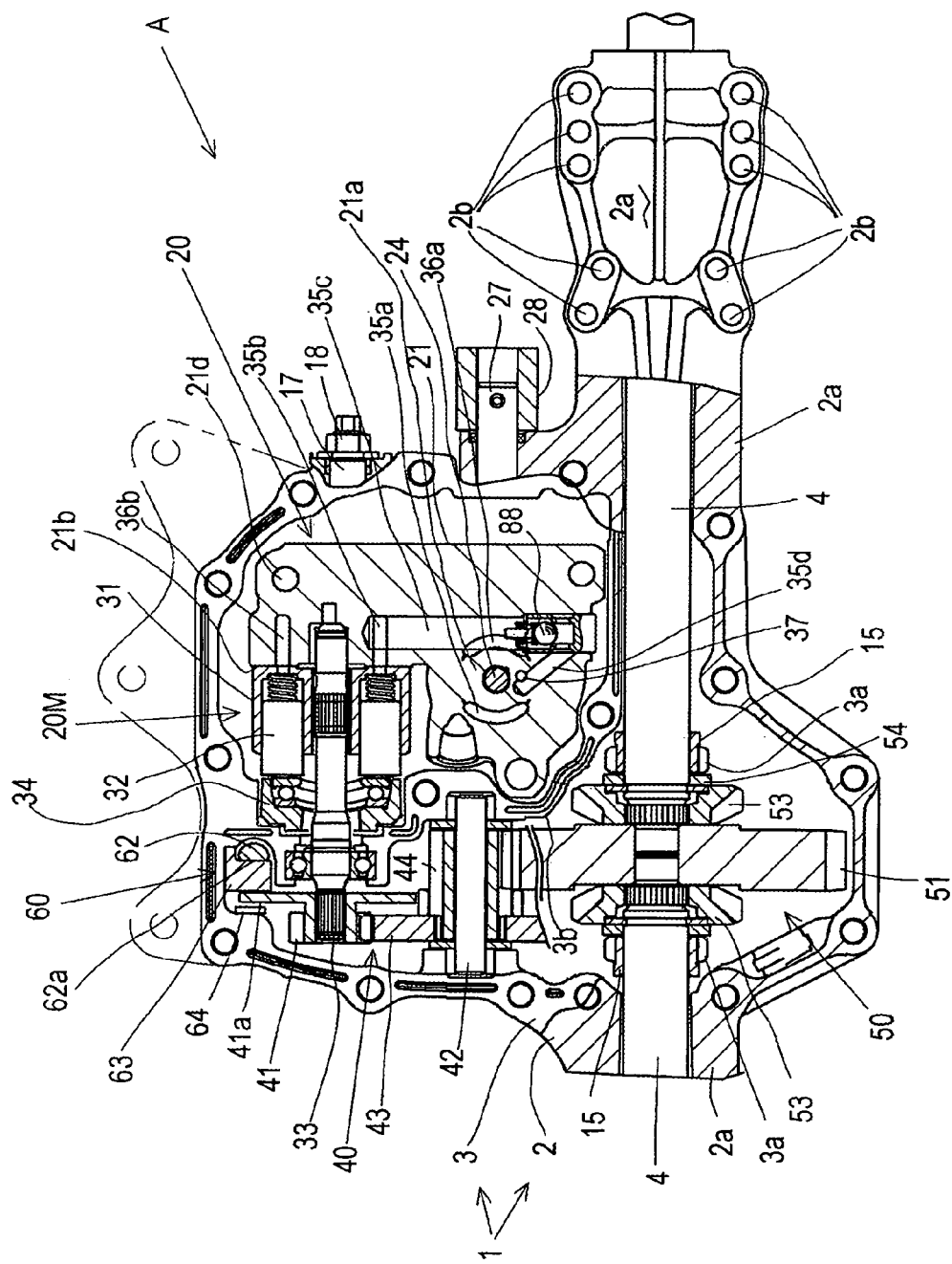
FIG. 2 is a plan view partly in section of the transaxle A, showing an interior construction of a transaxle housing 1 from which an upper housing element 2 is removed with remaining a part of the element 2.

Referring to FIGS. 1 and 2, general explanation will be given on a construction of a transaxle A concerning the present invention to be attached to steerable wheel support units B and a vehicle frame C. The vehicle frame C is disposed above the transaxle A so as to stride a center main part of the transaxle A. Left and right ends of the vehicle frame C are fixed to an upper surface of a transaxle housing 1 of the transaxle A. The transaxle housing 1 is constructed by joining an upper housing element 2 with a lower housing element 3 through a substantial horizontal joint surface. The steerable wheel support units B with respective tires 5 are attached to both ends of the transaxle housing 1, so as to steerably and drivingly connect the tires 5 to left and right axles 4 extended leftward and rightward from the transaxle housing 1, respectively. In addition, in FIG. 1, only one steerable wheel support unit B is disclosed so as to be representative of a pair of left and right steerable wheel support units B.

Referring to FIG. 1, explanation will be given on the steerable wheel support unit B. A center shaft 7 of a hub 6 of the tire 5 projects inward of the vehicle so as to serve as a part of a universal joint 13, and the outer end of the axle 4 projecting outward laterally from the transaxle housing 1 serves as another part of the universal joint 13 to be connected to the center shaft 7. Namely, by drivingly connecting the axle 4 to the center shaft 7 of the tire 5 through the universal joint 13, the tire 5 is provided as a steerable driving wheel.

The hub 6 is pivotally supported in a bearing holder 8 through a bearing. A pair of upper and lower knuckle arms 9 are fixed to the bearing holder 8, and extended inward of the vehicle. The ends of the knuckle arms 9 are pivotally connected to both outer ends of upper and lower substantially horizontal plate parts 11a of a fixed bracket 11 through upper and lower coaxial kingpins 10. A line extended from the axes of the kingpins 10 passes through the bending center axis of the universal joint 13 between the center shaft 7 of the tire 5 and the axle 4. Accordingly, the steerable wheel support unit B supports the tire 5 steerably against the bracket 11. In addition, a tie rod stay 9a is extended from a part of the upper knuckle arm 9, and connected to a tie rod stay 9a of the other steerable wheel support unit B through a tie rod (not shown).

With regard to the bracket 11, the basal ends of the upper and lower substantial horizontal plate parts 11a for attaching the kingpins 10 are connected and fixed to a substantial vertical plate part 11b, and the substantial vertical plate part 11b is provided thereon with a hole through which the axle 4 projecting laterally outward from the transaxle A passes freely. An attachment stay 11c is extensionally provided from the substantial vertical plate part 11b oppositely to the substantial horizontal plate parts 11a.

As shown in FIGS. 1 and 2, the upper housing element 2 of the transaxle housing 1 has left and right boss parts 2a, which project at respective outer ends laterally outward from the lower housing element 3, and cover the axles 4 in the whole peripheral direction. The left and right ends of the boss parts 2a are formed so as to be fastened to the left and right lower ends of the vehicle frame C, and to the attachment stays 11c of the steerable wheel support units B by bolts. Namely, each of the boss parts 2a has substantially horizontal upper and lower surfaces. The upper surfaces of the boss parts 2a can fit to left and right substantially horizontal lower ends Ca of the vehicle frame C, and the lower surfaces of the boss parts 2a can fit to the attachment stays 11c. Vertical penetrating bolt holes 2b are bored at front and rear portions of the boss part 2a in front and rear of an axial hole of the boss part 2a for passing the axle 4. A plurality of the bolt holes 2b are aligned laterally at each of the front and rear portions of the boss part 2a in front and rear of the axial hole. A bolt-and-nut is screwed into one selected from the bolt holes 2b at each of the front and rear portions of the boss part 2a in front and rear of the axial hole, so that the lower end Ca of the vehicle frame C abutting against the upper surface of the boss part 2 or the attachment stay 11c of the steerable wheel support unit B abutting against the lower surface of the boss part 2a is fastened to the upper housing element 2 by the bolt-and-nuts 12.

As shown in FIG. 1, the lower end Ca of the vehicle frame C abutting against the upper surface of the boss part 2a and the attachment stay 11c of the steerable wheel support unit B abutting against the lower surface thereof may be screwed together with the same bolt-and-nuts 12. Alternatively, the lower end Ca of the vehicle frame C abutting against the upper surface of the boss part 2a may be shifted laterally from the attachment stay 11c of the steerable wheel support unit B abutting against the lower surface thereof may be screwed together with the same bolt-and-nuts 12 so that the bolt holes 2b and bolt-and-nuts 12 for screwing the lower end Ca of the vehicle frame C may be different from those for screwing the attachment stay 11c of the steerable wheel support unit B. Whether the lower end Ca and the attachment stay 11c are screwed together with the common bolt-and-nuts 12 or not, a suitably positioned one can be selected among the laterally aligned bolt holes 2b at each of the front and rear portions of the boss part 2a in front and rear of the axial hole so as to correspond to the size of the lower end Ca or of the attachment stay 11c.

In this way, the steerable wheel support units B can be steerably attached to the respective axle-supporting boss parts 2a of the transaxle housing 1 for supporting the axles, thereby contributing to reduction of parts number and the standardization of the housing 1 of the transaxle A. Furthermore, the boss parts 2a can be used for the attachment of the transaxle A to the vehicle frame C. By providing the plurality of bolt holes 2b, the transaxle A can be standardized to reduce costs regardless of its attachment position relative to the vehicle frame C and the steerable wheel support units B.

Referring to FIG. 2, a schematic layout of interior elements of the transaxle A will be described. In the transaxle housing 1 of the transaxle A, the left and right axles 4 are disposed coaxially to each other, a differential gear mechanism 50 differentially connects inner ends of the axles 4 with each other. An HST 20 is disposed at one of front and rear sides of the axles 4, and a deceleration gear train 40, which is drivingly interposed between the HST 20 and the differential gear mechanism 50, is disposed at one of left and right sides of the HST 20. A brake mechanism 60, which directly brakes an output shaft of the HST 20 so as to brake the deceleration gear train 40, the differential gear mechanism 50 and the axles 4, is disposed on a later-discussed motor shaft 33 of a hydraulic motor 20M in the transaxle housing 1.

As the above mentioned, the transaxle housing 1 is constructed by mutually joining the peripheral parts (outer walls) of the upper housing element 2 and the lower housing element 3 with bolts 14. The HST 20, the deceleration gear train 40, the differential gear mechanism 50 and the brake mechanism 60 are covered by the upper housing element 2 and the lower housing element 3. The axles 4 are disposed higher than the horizontal joint surface between the upper and lower housing elements 2 and 3. As the above mentioned, a major part of each of the axles 4 is covered in the whole peripheral direction by each of the left and right boss parts 2a of the upper housing element 2. On the other hand, as shown in FIGS. 2 and 8, the upper housing element 2 is formed with axle support parts 2d, and the lower housing element 3 is formed with upwardly extended axle support parts 3a, so that parts of the axles 4 adjacent to the differential gear mechanism 50 are fitted at upper halves thereof to the respective axle support parts 2d through respective bushes 15, and at lower halves thereof to the respective axle support parts 3a through respective bushes 15, thereby being journalled by the respective bushes 15 serving as thrust bearings sandwiched between the respective axle support parts 2d and 3a.

Furthermore, as shown in FIGS. 2, 3, 5, 7 and 8, a vertical plate part 2e is extensionally formed downward from a ceiling portion of the upper housing element 2, a vertical plate part 3b is extensionally formed upward from a bottom portion of the lower housing element 3, and the vertical plate parts 2e and 3b are joined to each other so as to form a partition dividing the inside space of the hosing into an HST chamber, in which the HST 20 is housed, and a gear chamber, in which the deceleration gear train 40, the differential gear mechanism 50, the brake mechanism 60 and the axles 4 are housed. The HST chamber and the gear chamber are filled with oil so as to form respective oil sumps therein.

Figure 8:
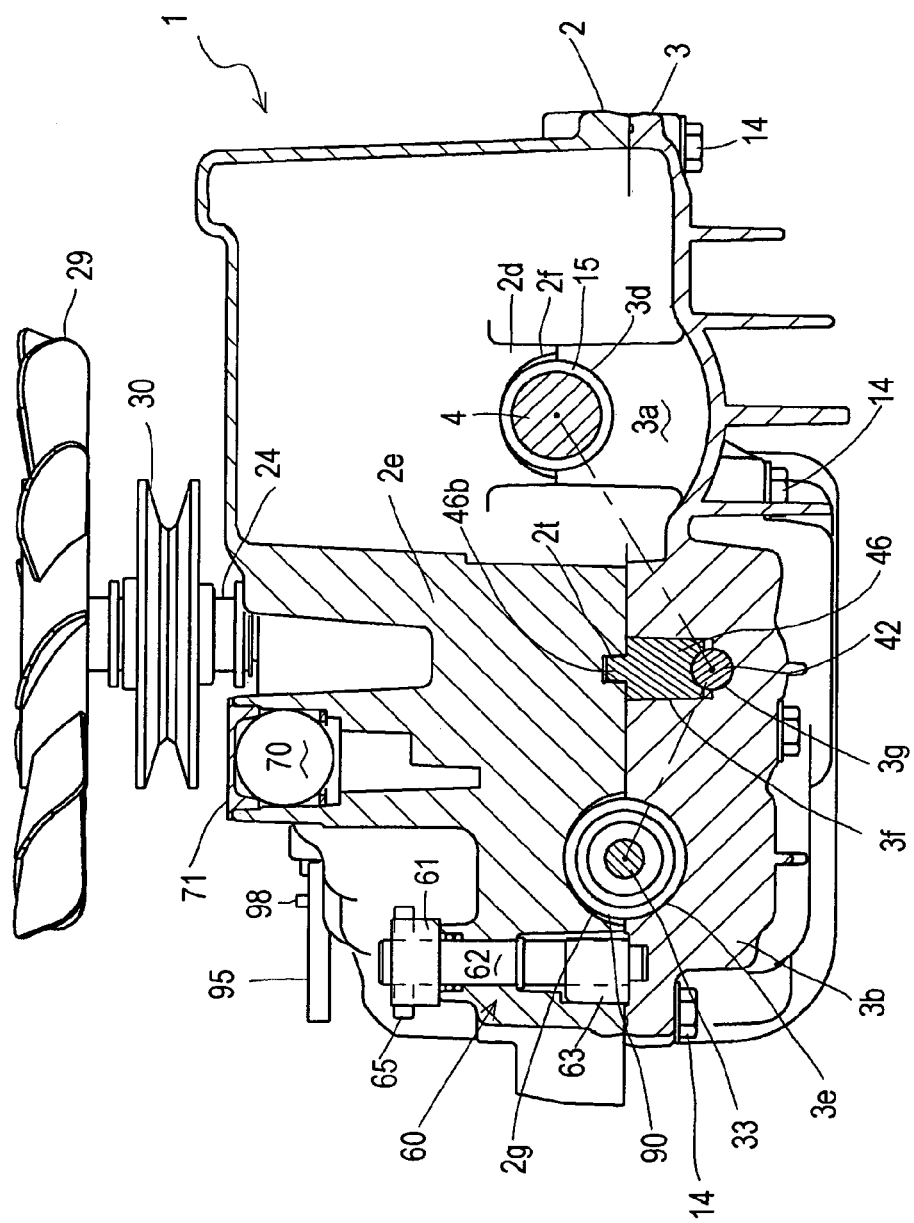
FIG. 8 is a sectional side view of the transaxle A, showing a pivotal support construction for a motor shaft 33, the counter shaft 42 of the deceleration gear train 40, and the axles 4, and a brake mechanism 60.

As shown in FIG. 8, an upper portion of the vertical plate part 2e is notched so as to form a communication passage between the HST chamber and the gear chamber, and a magnet disc 70 is disposed in this passage. The magnet disc 70 adsorbs shavings of the gears mixed in oil from the gear chamber so as to filter the oil before entering the HST chamber. In addition, a lid 71 closes an upper opening of the communication passage in which the magnet disc 70 is disposed.

Figure 3:
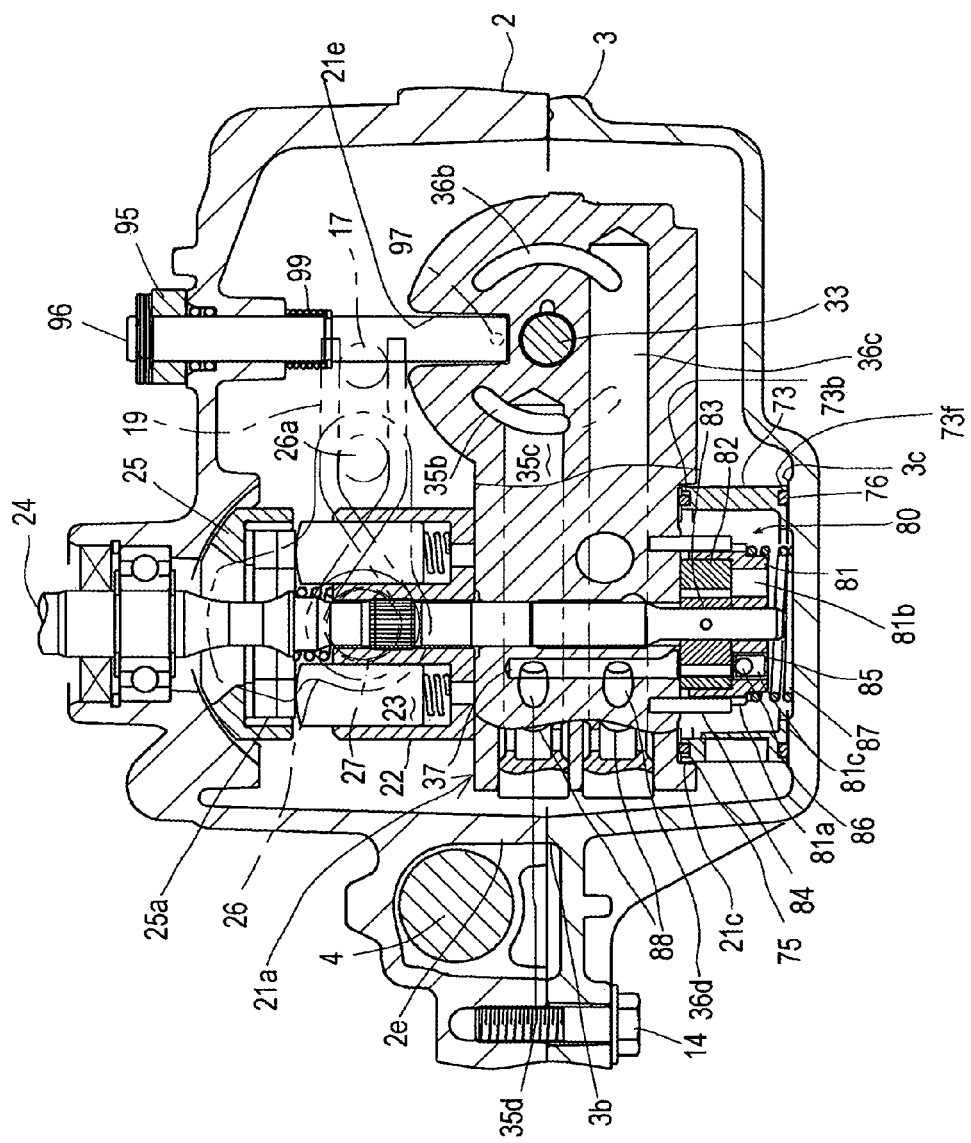
FIG. 3 is a sectional side view of the transaxle A, showing an HST 20 (especially, a hydraulic pump 20P, a charge pump 80 and an oil filter 73) and axles 4 in the transaxle housing 1.
Figure 5:
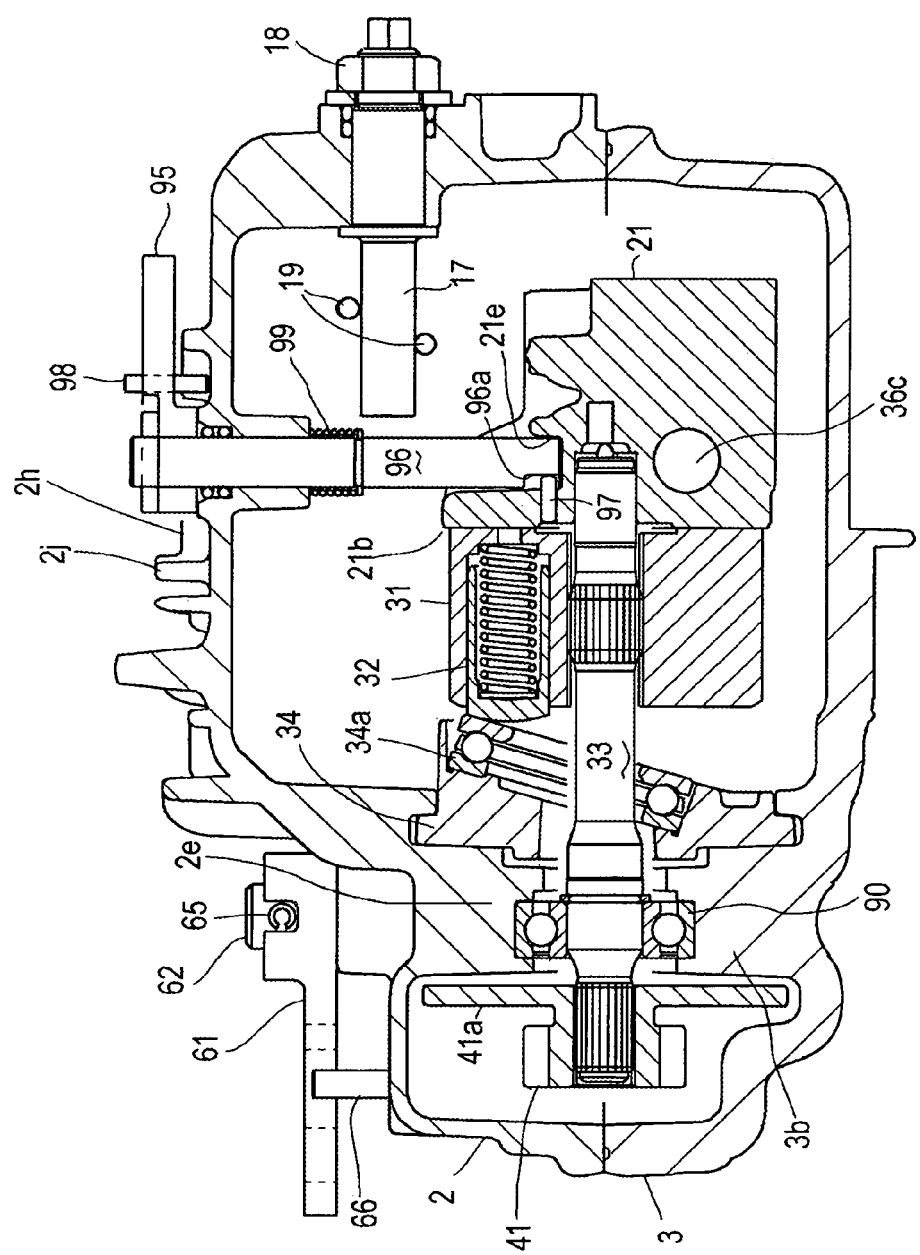
FIG. 5 is a sectional side view of the transaxle A, showing a hydraulic motor 20M in the transaxle housing 1.
Figure 7:
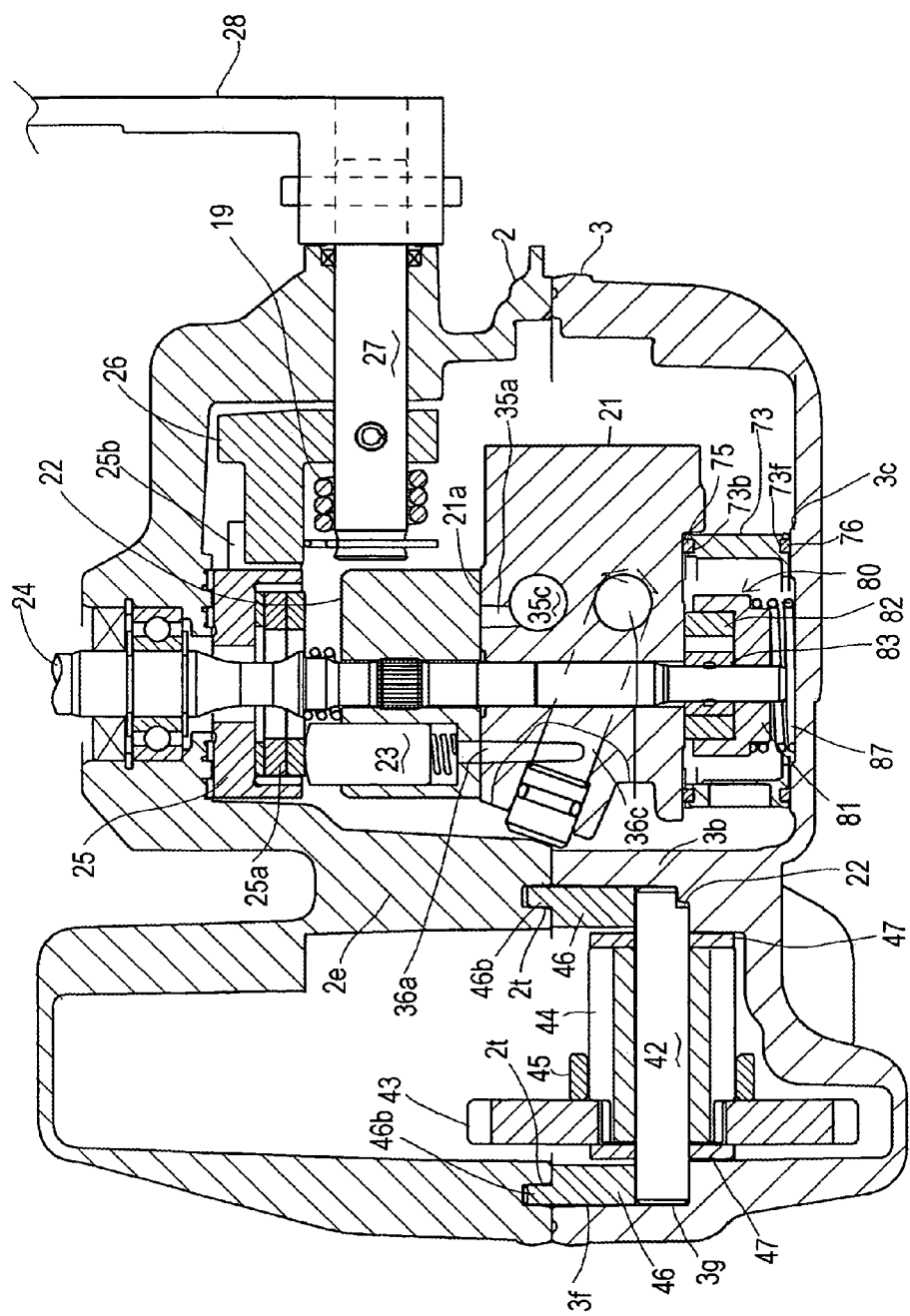
FIG. 7 is a sectional side view of the transaxle A, showing the HST 20 (especially, the hydraulic pump 20P, the charge pump 80 and the oil filter 73) and a counter shaft 42 of a deceleration gear train 40 in the transaxle housing 1.

Referring to FIGS. 2, 3, 5 and 7, the HST 20 will be described. A center section 21 is fastened to the upper housing element 2 or the lower housing element 3 by bolts screwed into bolt holes 21*d* shown in FIG. 2. As shown in FIGS. 2 and 3, the center section 21 has a horizontal upper surface serving as a pump attachment surface 21*a* near the axles 4 in the fore-and-aft direction, and has a vertical motor attachment surface 21*b* which is more distant from the axles 4 in the fore-and-aft direction than the pump attachment surface 21*a*. As shown in FIGS. 3 and 7, a cylinder block 22 of a hydraulic pump 20P is rotationally slidably attached to the pump attachment surface 21*a*, and as shown in FIG. 5, a cylinder block 31 of the hydraulic motor 20M is rotationally slidably attached to the motor attachment surface 21*b*.

As shown in FIGS. 2, 3, 5 and 7, the center section 21 is bored by a pair of kidney ports 35*a* and 36*a* opened on the pump attachment surface 21*a*, a pair of kidney ports 35*b* and 36*b* opened on the motor attachment surface 21*b*, an upper oil passage 35*c* mutually connecting the kidney ports 35*a* and 35*b*, and a lower oil passage 36*c* mutually connecting the kidney ports 36*a* and 36*b*, thereby constituting a closed circuit fluidly connecting the hydraulic pump 20P to the hydraulic motor 20M. In addition, as shown in FIGS. 2 and 3, the upper oil passage 35*c* is a horizontal straight oil hole, and the lower oil passage 36*c* is constructed so that a vertically slanted oil hole, which is opened the kidney port 36*a* as shown in FIG. 7, is connected to a horizontal straight oil, which is disposed just in parallel to and just under the oil passage 35*c* and opened to the kidney port 36*b* as shown in FIG. 3.

As shown in FIGS. 3 and 7, pistons 23 are vertically reciprocally slidably inserted into a plurality of vertical piston holes of the cylinder block 22, respectively, and heads of the pistons 23 are pressed against a thrust bearing 25*a* of a movable swash plate 25 disposed above the cylinder block 22. The movable swash plate 25 is slidably engaged with an arculately shaped ceiling of the upper housing element 2. To control a slant angle of the movable swash plate 25, as shown in FIGS. 2 and 7, a laterally horizontal pump control shaft 27 (in parallel to the axles 4) is rotatably supported by a side wall of the upper housing element 2. In the transaxle housing 1, an internal control arm 26 is fixed to the pump control shaft 27, and a tip of the arm 26 is inserted into an insertion groove 25*b* formed in a side end of the movable swash plate 25. As shown in FIGS. 1, 2 and 7, out of the transaxle housing 1, an external control arm 28 is fixed to the outer end of the pump control shaft 27, and connected to a speed change operation means (not shown), such as a pedal or lever, provided at an operation part of the vehicle. By operating the speed change operation device, a free end of the external control arm 28 rotates in the fore-and-aft direction, that is, perpendicularly to the axles 4. Accordingly, the pump control shaft 27 and the internal control arm 26 rotate integrally with the external control arm 28 so as to slant the movable swash plate 25 so as to change oil-delivery amount and direction (for either forward or backward traveling) of the hydraulic pump 20P, thereby changing rotary speed and direction of the hydraulic motor 20M.

Furthermore, in the transaxle housing 1, as shown in FIG. 3, a part of the internal control arm 26 is extended so as to serve as a shaft part 26*a* projecting laterally horizontally, that is, in parallel to the pump control shaft 27. As shown in FIGS. 2, 3 and 5, a lateral horizontal shaft 17 pivotally penetrates the outer side wall of the upper housing element 2. The shaft 17 is an eccentric shaft, and fastened to the upper housing element 2 by a nut 18 out of the upper housing element 2. Furthermore, in the upper housing element 2, a neutral return spring 19 is wound around the pump control shaft 27. Both ends of the spring 19 cross each other, and extend so as to pinch the shaft part 26*a* and the shaft 17 at the time that the external control arm 28 (i.e., the above-mentioned speed change operation means) and the movable swash plate 25 are in their neutral position.

When the external control arm 28 is rotated from its neutral position by operating the speed change operation means, the shaft part 26*a* pushes one of the ends of the spring 19 away from the other end of the spring 19 retained by the shaft 17, thereby generating biasing force on the spring 19 for returning the shaft 27, the arms 26, 28 and the movable swash plate 25 to their neutral positions. Therefore, when the speed change operation means is released from the operating force, the shaft 27, the arms 26, 28 and the movable swash plate 25 automatically return to their neutral positions.

In addition, when an error exists between the neutral position of the movable swash plate 25 (the position at which the actual oil-delivery amount of the hydraulic pump 20P becomes 0) and the neutral position of the shaft 27 and the arms 26 and 28 (and the speed change operation means), the nut 18 is loosened and the position of the eccentric shaft 17 is adjusted so as to absorb the error. Namely, the retained position of one of the ends of the spring 19, demarcated as the neutral position of the shaft 27 and the arms 26 and 28 (and the speed change operation means), is adjusted. When the shaft 17 is adjusted to a suitable position, the nut 18 is fastened again so as to fix the shaft 17 to the upper housing element 2.

As shown in FIGS. 3 and 7, a vertical pump shaft 24 is not-relatively rotatably engaged in the center portion of the cylinder block 22. The pump shaft 24 extends upward from the cylinder block 22, freely rotatably penetrates the movable swash plate 25, and projects upward from the upper housing element 2. The upwardly projecting portion of the pump shaft 24 is fixedly provided thereon with a cooling fan 29 and an input pulley 30, as shown in FIGS. 1 and 8. A belt (not shown) is wound between the input pulley 30 and an output pulley of an engine (not shown) so as to input power of the engine into the pump shaft 24. In addition, as shown in FIG. 1, the vehicle frame C, which is attached to the transaxle A in the above-mentioned way, is extend over the external control arm 28 projecting upward from the transaxle housing 1, the cooling fan 29 and the input pulley 30 so as to be prevented from interfering with them.

On the other hand, as shown in FIG. 5, pistons 32 are horizontally reciprocally slidably inserted into respective horizontal piston holes of the cylinder block 31, and heads of the pistons 32 are pressed against a thrust bearing 34*a* of a fixed swash plate 34 fixedly engaged with the vertical plate parts 2*e* and 3*b* of the upper and lower housing elements 2 and 3. The horizontal motor shaft 33 is not-relatively rotatably engaged in the center portion of the cylinder block 31. The motor shaft 33 extends horizontally from the cylinder block 31, penetrates the fixed swash plate 34 and the vertical plate parts 2*e* and 3*b*, and projects into the gear chamber of the transaxle housing 1 so as to be drivingly connected to the deceleration gear train 40.

As shown in FIGS. 3 and 7, the pump shaft 24 extends downward from the cylinder block 22, and rotatably penetrates the center section 21 vertically, whereby the pump shaft 24 projects downward from the bottom surface of the center section 21 so as to serve as a drive shaft of a charge pump 80 attached to the bottom of the center section 21.

The charge pump 80 comprises a pump casing 81, an outer rotor 82 and an inner rotor 83. As shown in FIGS. 3 and 7, the pump casing 81 has an upper diametrically large part and a lower diametrically small part. A vertical guide groove 81a is formed along the outer peripheral surface of the diametrically large part. A vertical detent pin 84 is axially slidably inserted into the guide groove 81a, and an upper portion of the pin 84 is inserted upward into the center section 21. Furthermore, a coiled spring 87 is interposed between the upper (inner) bottom surface of the lower housing element 3 and a downward bottom surface of the diametrically large part of the pump casing 81 (i.e., a downward surface of a step between the diametrically large part and the diametrically small part), so as to be extended along the outer peripheral surface of the diametrically small part of the pump casing 81. Accordingly, the pump casing 81 is engaged with the center section 21 so as to be vertically slidable to some degree and unrotatable relatively to the center section 21, and is biased upward by the spring 87.

An upwardly opened pump chamber is formed in the diametrically large part of the pump casing 81. The outer rotor 82 is inserted into the pump chamber along the inner peripheral surface of the pump chamber. The inner rotor 83 is surrounded by the outer rotor 82 and fixed to the pump shaft 24 projecting downward from the center section 21. Namely, in the pump casing 81 not-relatively rotatably engaged with the center section 21, the inner rotor 83 rotates together with the pump shaft 24 so as to pressurize oil between the inner rotor 83 and the outer rotor 82 and discharge it.

In the center section 21, as shown in FIGS. 2 and 3, a downwardly opened vertical charge oil passage 37 is bored near the pump shaft 24, and upper and lower horizontal charge oil passages 35d and 36d communicating with the respective oil passages 35c and 36c are bored from the vertical charge oil passage 37. The lower end opening of the vertical charge oil passage 37 faces the oil chamber between the outer rotor 82 and the inner rotor 83, and oil pressurized and discharged from the oil chamber is supplied to one of the oil passages 35c and 36c through the vertical charge oil passage 37 and the corresponding horizontal charge oil passage 35d or 36d. A valve 88 is disposed in the junction between the oil passage 35c and the horizontal oil passage 35d, and a valve 88 in the junction between the oil passage 36c and the horizontal oil passage 36d. The valve 88 is a check valve which permits only the flowing of oil from each of the horizontal charge oil passages 35d and 36d, so that, the valve 80 is opened to receive the oil discharged from the charge pump 80 when the corresponding oil passage 35c or 36c is hydraulically depressed.

The pump shaft 24 relatively rotatably penetrates a part of the pump casing 81 below the inner rotor 83. The bottom surface of the pump casing 81 is separated upward from the upper surface of the bottom portion of the lower housing element 3. A suction port 81b and an auxiliary suction port 81c vertically penetrate the pump casing 81 between the bottom surface of the pump casing 81 and the bottom surface of the pump chamber, as shown in FIG. 3. In the pump chamber, the upper end of the suction port 81b is opened to an oil chamber (suction oil chamber) between the outer rotor 82 and the inner rotor 83 for depressing oil therein during rotation of the inner rotor 83, and the upper end of the auxiliary suction port 81c is opened to an oil chamber (discharge oil chamber) for pressurizing oil therein during rotation of the inner rotor 83.

A valve casing 85 is inserted into the auxiliary suction port 81c, and a check valve 86 is vertically movably disposed in the valve casing 85. The valve casing 85 has an upper end opening communicating with the discharge oil chamber, and has a lower end opening communicating with the oil sump in the transaxle housing 1 below the pump casing 81. The check valve 86 usually closes the lower end opening by its gravity. When the discharge oil chamber is hydraulically depressed, the check valve 86 is raised upward from the lower end opening of the valve casing 85 by the negative pressure force, whereby the upper and lower end openings of the valve casing 85 are opened so as to open the discharge oil chamber to the oil sump below the pump casing 81.

By rotating the engine of the vehicle, the pump shaft 24 and the inner rotor 83 are rotated. Accordingly, oil in the oil sump below the pump casing 81 enters the suction oil chamber in the pump chamber through the suction port 81b, and is discharged from the suction oil chamber to the vertical charge oil passage 37 so as to be supplied to either the hydraulically depressed oil passage 35c or 36c. Simultaneously, the check valve 86 closes the lower end opening of the valve casing 85.

The outer rotor 82 and the inner rotor 83 project upward from the upper end of the pump casing 81, so as to be pressed at upper surfaces thereof against the bottom surface of the center section 21. This pressure is caused by the upward biasing force of the spring 87, and can be changed by exchanging the spring 87 for a spring having a different biasing force.

As mentioned above, during rotation of the engine of the vehicle, the charge pump 80 is driven so as to supply oil from the oil sump in the transaxle housing 1 to the closed circuit between the hydraulic pump 20P and the hydraulic motor 20M. However, while the vehicle is stationary on a slope, even if the engine is not driven, hydraulic pressure in the closed circuit is increased so that oil may leak from gaps of component parts in the course of time. However, the oil leak causes hydraulic depression of the discharge oil chamber, whereby the check valve 86 is raised upward and oil is supplied from the oil sump in the transaxle housing 1 to the vertical charge oil passage 37 through the auxiliary suction port 81c. Accordingly, even if the inner and outer rotors are not driven, oil can be supplied to the closed circuit.

Figure 4:
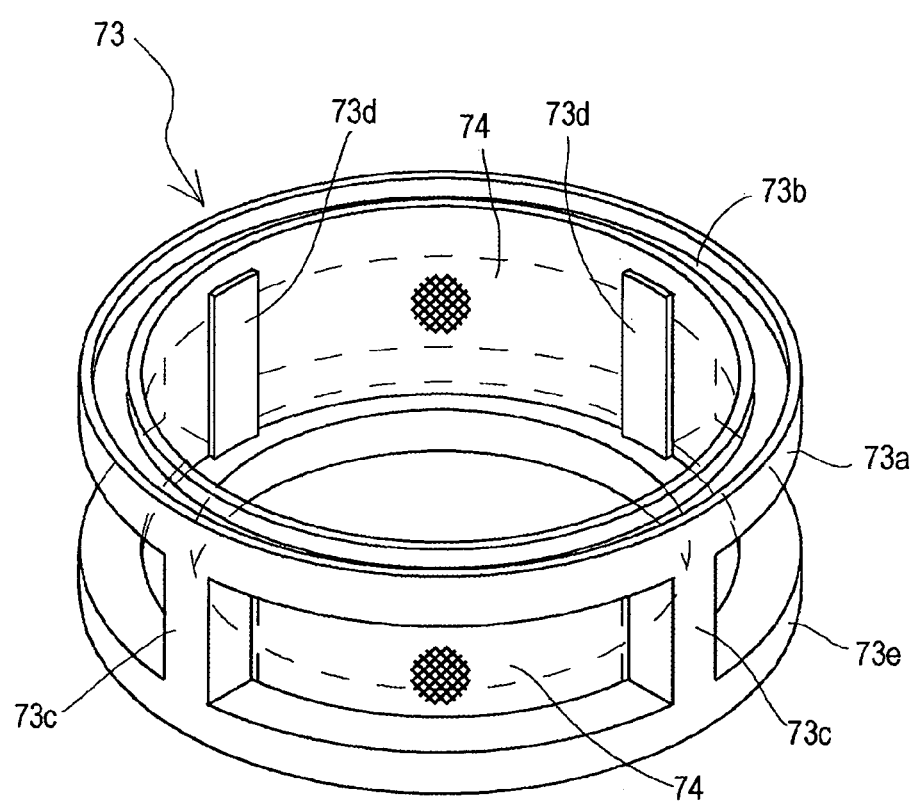
FIG. 4 is a perspective view of the oil filter 73 shown in FIG. 3.

As shown in FIGS. 3 and 7, an oil filter 73, which is entirely cylindrical as shown in FIG. 4, is sandwiched between the bottom surface of the center section 21 and the upper (inner) bottom surface of the lower housing element 3 so as to enclose the charge pump 80.

As shown in FIG. 4, the oil filter 73 comprises an upper ring part 73a whose upper surface faces the bottom surface of the center section 21, a lower ring part 73e whose lower surface faces the upper bottom surface of the lower housing element 3, and a plurality of vertical strut parts 73c which connect the upper ring part 73a to the lower ring part 73e.

The upper ring part 73a is formed with an annular recess 73b downward from the horizontal upper surface thereof and along the peripheral edge thereof. As shown in FIGS. 3 and 7, a seal ring 75 is engaged into the recess 73b so as to be fluid-tightly fitted to the bottom surface of the center section 21. In addition, as shown in FIGS. 3 and 7, the center section 21 is formed with a circular recess 21c upward from the bottom surface thereof. The outer peripheral surface of the top portion of the upper ring part 73a is fitted to the vertical peripheral surface of the recess 21c so as to secure the position of the oil filter 73 relative to the center section 21.

On the other hand, the lower ring part 73e is also formed with a recess 73f upward from the horizontal lower surface thereof. As shown in FIGS. 3 and 7, a ring-like oil seal 76 is engaged into the recess 73f so as to be fitted to an upper surface of a projection 3c, which is annular when viewed in plan, slightly projecting upward from the upper bottom surface of the lower housing element 3. In addition, the lower end of the coil spring 87 of the charge pump 80 is inserted into the annular projection 3c.

Alternatively, the recess 73b formed on the upper surface of the upper ring part 73a may be concentrically multiplied so as to have multiple concentric oil seals 75 engaged therein. The same may be said for the recess 73f on the lower surface of the lower ring part 73e.

Further alternatively, the upper ring part 73a of the oil filter 73 may be integrally formed with a seal lip, which projects upward from the upper surface of the upper ring part 73a so as to be pressed against the bottom surface of the center section 21. The lower ring part 73e of the oil filter 73 may be integrally formed with a seal lip, which projects downward from the bottom surface of the upper ring part 73a so as to be pressed against the upper bottom surface of the lower housing element 3 (the projection 3c). Further alternatively, the seal lip projecting from the upper ring part 73a may be concentrically multiplied, and the seal lip projecting from the lower ring part 73e may be concentrically multiplied.

The lower ring part 73e has a portion centripetally extended further from the inner side surfaces of the strut parts 73c, which has an upper surface stepped downward from the upper surface of a radially outward portion of the lower ring part 73e on which the strut parts 73c stand. Vertical pinching plate parts 73d are extended upward from the downwardly stepped upper surface of the lower ring part 73e and along the respective strut parts 73c. Each of the pinching plate parts 73d has a small gap from the strut part 73c facing it, and also has a small gap at its upper portion from the inner peripheral side surface of the upper ring part 73a. A cylindrical net member 74 is inserted downward into the gaps so as to abut at its lower end against the downwardly stepped upper surface of the lower ring part 73e. The net member 74, after being fitted in this way, is welded to the vertical inner peripheral surface of the upper ring part 73a, the vertical surfaces of the strut parts 73c and the pinching plate parts 73d facing the net member 74, and the vertical surface of the step between the radially outer and inner upper surfaces of the lower ring part 73e.

When the oil filter 73 is viewed from the outside, the oil filter 73 has openings, each of which is disposed between the adjoining strut parts 73c along the peripheral surface of the oil filter 73, covered with the net member 74. Oil in the oil sump in (the HST chamber of) the transaxle housing 1 is filtered when passing through the net member 74, and flows to the inside of the oil filter 73 to be sucked into the charge pump 80.

As shown in FIGS. 3 and 5, an upwardly opened vertical recess 21e is formed in the center section 21 just above the motor shaft 33, and a lower end of a vertical cam shaft 96 is rotatably inserted into the vertical recess 21e. In the vertical recess 21e, a part of the lower end of the vertical cam shaft 96 is notched so as to form a vertical cam surface 96a. The cam shaft 96 is rotatably supported by the upper wall of the upper housing element 2, and projects upward from the upper housing element 2 so as to be fixedly provided on the upper end thereof with a lever 95.

Figure 6:
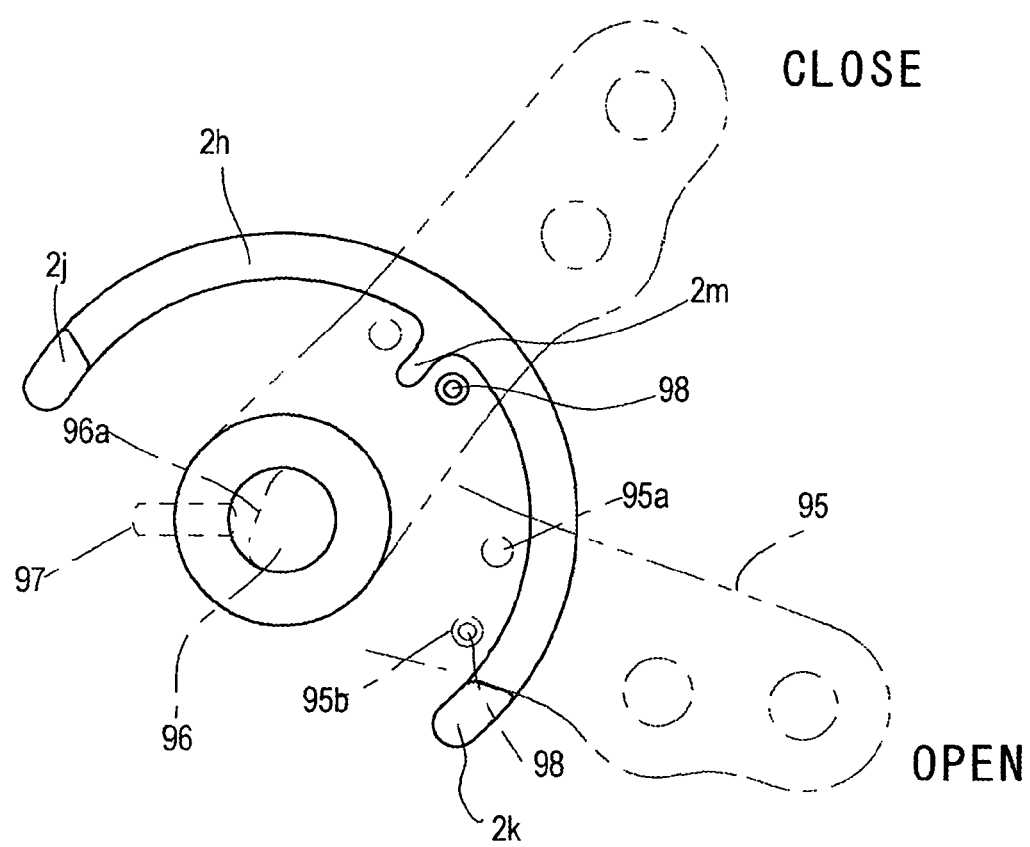
FIG. 6 is a schematic plan view of a construction of guiding an oil release lever 95 for forcibly releasing oil from the hydraulic motor 20M, formed on the upper surface of the transaxle housing 1 shown in FIG. 5.

As shown in FIGS. 5 and 6, the upper housing element 2 is formed with a guide part 2h, which is semicircular when viewed in plan, projecting from the upper surface thereof. The lever 95 is horizontally rotatably disposed just above the guide part 2h. Both ends of the guide part 2h are stepped upward so as to serve as stopper parts 2j and 2k, which can abut against the lever 95. The center portion of the guide part 2h between the both ends thereof is formed as a stopper part 2m extending toward the center axis of the cam shaft 96. The lever 95 is formed with a pair of downwardly opened pin holes 95a and 95b aligned in the rotation direction of the lever 95. A pin 98 is inserted into one of the pin holes 95a and 95b, and extended downward so as to be able to abut against the stopper part 2m.

The position of the lever 95 abutting against one of the stopper parts 2j and 2k is demarcated as an opening position. Whether the stopper part 2j or 2k is provided to abut against the lever 95 depends upon which rotational direction and position of the lever is set for forcibly releasing oil. If the stopper part 2j is demarcated as the opening position, the pin 98 is inserted into the pin hole 95a, and the position of the lever 95 where the pin 98 abuts against the stopper part 2m is defined as a closing position. On the other hand, as shown in FIG. 6, if the stopper part 2k is demarcated as the opening position, the pin 98 is inserted into the pin hole 95b, and the position of the lever 95 where the pin 98 abuts against the stopper part 2m is demarcated as the closing position. In addition, a neutral biasing spring 99 is attached to the cam shaft 96 inside (alternatively, outside) the transaxle housing 1 so as to press the lever 95 against the housing.

A horizontal pin hole penetrates the center section 21 between the recess 21e and the motor attachment surface 21b, and a pin 97 is axially slidably inserted into this pin hole. One of ends of the pin 97 enters the recess 21e to substantially perpendicularly face to the cam surface 96a. In the normal case, i.e., when the lever 95 is disposed at the closing position, the other end of the pin 97 is withdrawn back from the motor attachment surface 21b. At this time, the cylinder block 31 of the hydraulic motor 20M rotationally slidably fitted to the motor attachment surface 21b of the center section 21 so as to prevent oil from leaking out between the motor attachment surface 21b and the cylinder block 31.

When oil has to be released from the closed circuit for hauling the vehicle or for another reason, the lever 95 is shifted to the opening position so as to be pressed against one of the stopper parts 2j, 2k and 2m. Accordingly, the cam surface 96a of the rotated cam shaft 96 slants relative to the axis of the pin 97, and thrusts out the pin 97. Therefore, the pin 97 projects outward from the motor attachment surface 21b and separates the cylinder block 31 from the motor attachment surface 21b. Accordingly, oil leaks out from the kidney ports 35b, 36b and the cylinder holes in the cylinder block 31 to the oil sump in the transaxle housing 1 so as to reduce the oil pressure in the closed circuit, that is, to reduce the hydraulic braking force applied on the hydraulic motor 20M, whereby the tires 5 can rotate easily.

Figure 9:
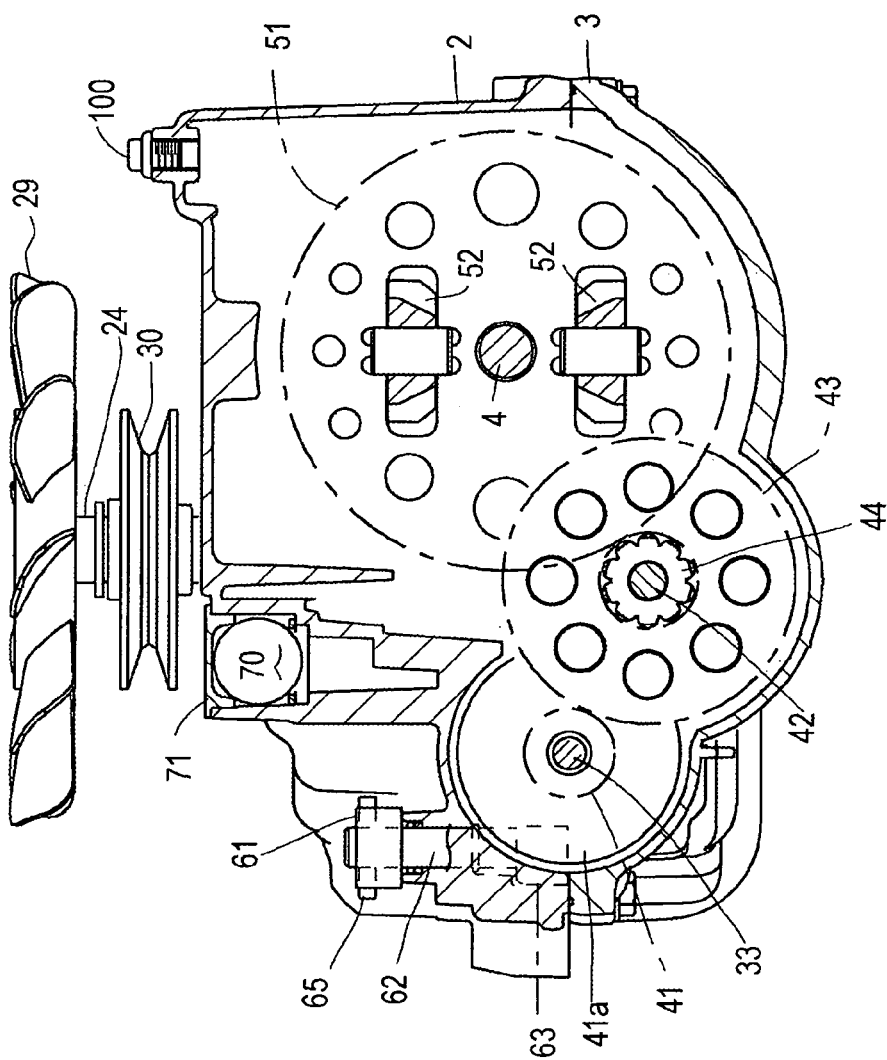
FIG. 9 is a sectional side view of the transaxle A, showing a gear arrangement in the transaxle housing 1 from the deceleration gear train 40 to a differential gear mechanism 50.

In addition, as shown in FIG. 9, a breather 100 is provided on the upper portion of the upper housing element 2 so as to adjust the air pressure in the HST chamber above the oil sump in correspondence to volumetric change of the oil sump in the HST chamber.

Explanation will now be given on construction of the deceleration gear train 40, the differential gear mechanism 50 and the brake mechanism 60. As shown in FIGS. 2, 5, 8 and 9, the motor shaft 33 is disposed laterally horizontally, that is, in parallel to the axles 4, and is pivotally supported by a bearing 90 sandwiched between the upper and lower vertical plate parts 2e and 3b, and an outer end of the motor shaft 33 projects into the gear chamber in the transaxle housing 1. A motor gear 41 is not-relatively rotatably but axially slidably spline-fitted on the outer end of the motor shaft 33.

As shown in FIGS. 2 and 5, a brake disc 41a is integrally formed on the motor gear 41. A brake pad 64 is disposed near the brake disc 41a, and engaged with the inner side surface of the outer wall of the housing 1, as shown in FIG. 2. As shown in FIGS. 2, 8 and 9, a pressing member 63 is disposed oppositely to the brake pad 64 with respect to the brake disc 41a, and a vertical brake cam shaft 62 is disposed oppositely to the brake disc 41a with respect to the pressing member 63. The lower end of the brake cam shaft 62 is notched into a substantially semicircular shape when viewed in section, so as to form a vertical cam surface 62a.

As shown in FIG. 2, the cam surface 62a, disposed in parallel to the brake disc 41a when viewed in plan, faces the pressing member 63, whereby the brake disc 41a is separated from both the pressing member 63 and the brake pad 64 so as to allow the motor shaft 33 to be rotated by the output of the hydraulic motor 20M. Then, by rotating the brake cam shaft 62 around the vertical axis thereof, the cam surface 62a slants relative to the brake disc 41a when viewed in plan, and an end edge of the cam surface 62a presses the pressing member 63 against the brake disc 41a, whereby the brake disc 41a is pressed between the pressing member 63 and the brake pad 64 so as to be braked. Accordingly, the deceleration gear train 40, the differential gear mechanism 50 and the axles 4 disposed on the downstream of the brake disc 41a in the power train are braked.

Figure 10A:
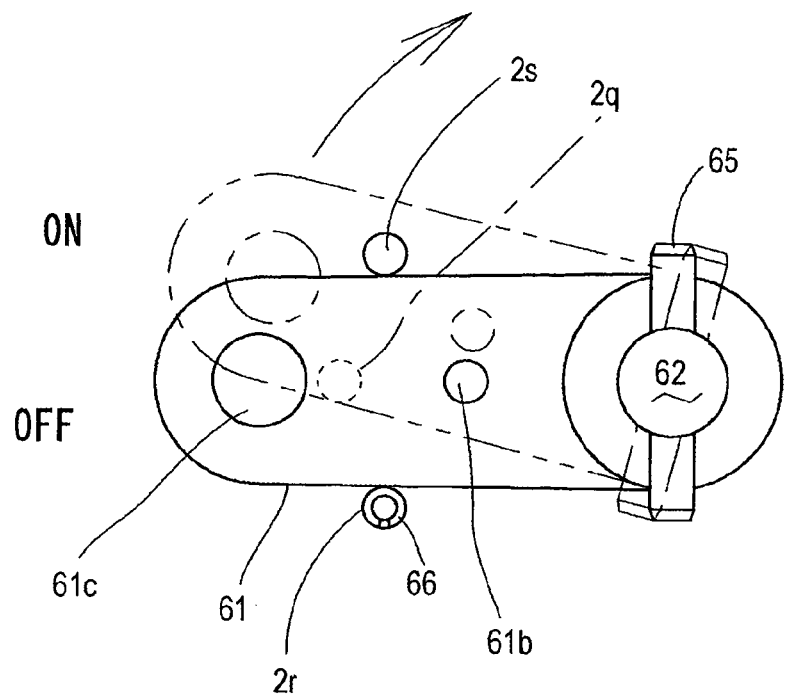
FIG. 10 (*a*) is a plan view of a first mode of a neutral biasing support construction for a brake arm 61 of the brake mechanism 60 to a neutral position, and FIG. 10 (*b*) is a sectional front view of the same.
Figure 10B:
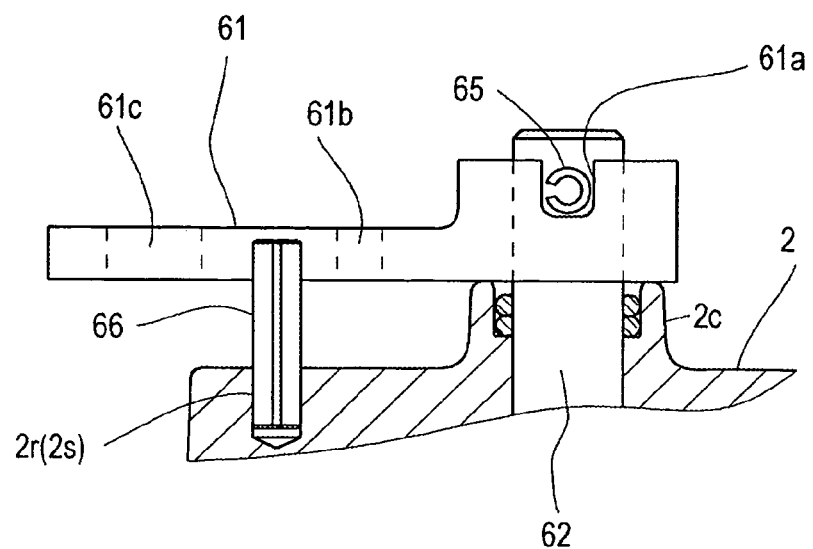

The brake cam shaft 62 projects upward from the upper housing element 2 so as to be fixedly provided thereon with a brake arm 61, as shown in FIGS. 8 and 9. A first embodiment shown in FIGS. 10 (a) and (b) and a second embodiment shown in FIGS. 11 (a) and (b) are provided as embodiments of construction for guiding rotation of the brake arm 61, for positioning the brake arm 61, and for biasing the brake arm 61 to its neutral position. Explanation will now be given on the first and second embodiments.

In both of the embodiments, the common brake arm 61 is used, and the upper housing element 2 is formed with common pin holes for positioning the brake arm 61. Explanation will be given on common construction of the two embodiments. A horizontal pin 65 diametrically penetrates the upper end portion of the brake cam shaft 62. A boss part of the brake arm 61 is provided on the upper portion of the brake cam shaft 62, and the pin 65 projects at both ends thereof outward from the brake shaft 62 so as to be inserted into notches 61a formed in the boss part of the brake arm 61, thereby not-relatively rotatably engaging the brake arm 61 to the brake cam shaft 62. A pin hole 61c is bored in a tip portion of the brake arm 61 opposite to the boss part so as to be engaged with an end of a link connected to the speed change operation means (such as a pedal or a lever) provided near an operator's seat. A vertical pin hole 61b penetrates the brake arm 61 between the boss part and the pin hole 61c.

When the brake arm 61 is disposed at a brake-off position for releasing the brake, the brake disc 41a is separated from the pressing member 63 as mentioned above, so as to allow the motor shaft 33 to be rotated by the output of the hydraulic motor 20M. When the brake arm 61 is rotated in one of opposite directions from the brake-off position and reaches a brake-on position, the brake disc 41a is pressed between the pressing member 63 and the brake pad 64 so as to brake the motor shaft 33. An upwardly opened vertical pin hole 2q is bored in the upper housing element 2 so that, while the brake arm 61 is disposed at the brake-off position, the center of the brake arm 61 is disposed between the central points of the pin holes 61b and 61c when viewed in plan. Further, upwardly opened vertical pin holes 2r and 2s are bored in the upper housing element 2 at positions close to respective opposite side edges of the brake arm 61 disposed at the brake-off position.

The brake cam shaft 62 and the brake arm 61 are provided with means for biasing them to the brake-off position. Here, the embodiment shown in FIGS. 10 (a) and (b) is adopted in the case that the biasing means (such as a spring) is disposed in the transaxle housing 1. To retain the brake arm 61 at the brake-off position, an upward projecting pin 66 is inserted into one of the pin holes 2r and 2s (in FIG. 10 (a), the pin hole 2r) and pressed against the side edge of the brake arm 61 disposed at the brake-off position. Whether the pin 66 is inserted into the pin hole 2r or 2s depends upon in which direction the brake arm 61 is rotated from the brake-off position to the brake-on position. Namely, while the common brake arm 61 and upper housing element 2 are used, the only thing required to correspond to any of different rotation settings of the brake arm 61 between the brake-on position and the brake-off position is to change the position of the pin 66 relative to the upper housing element 2.

Figure 11A:
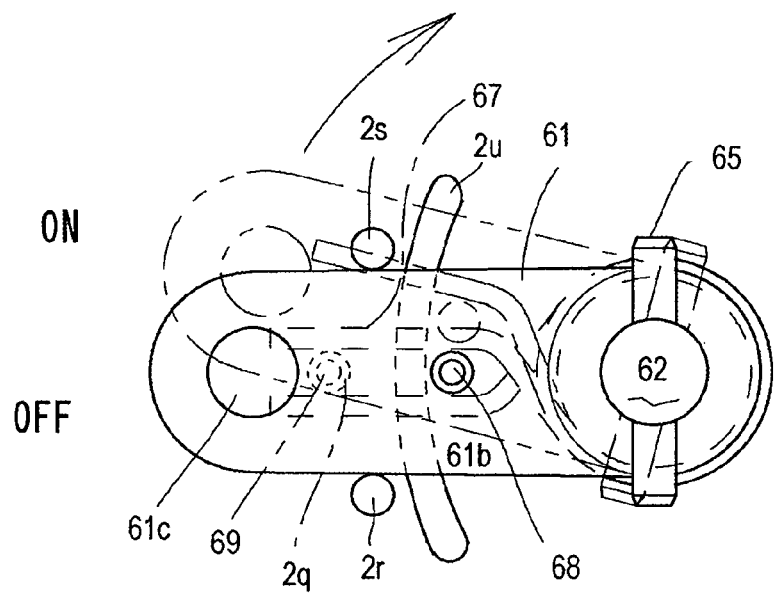
FIG. 11 (*a*) is a plan view of a second mode of a neutral biasing support construction for a brake arm 61 of the brake mechanism 60, and FIG. 11 (*b*) is a sectional front view of the same.
Figure 11B:
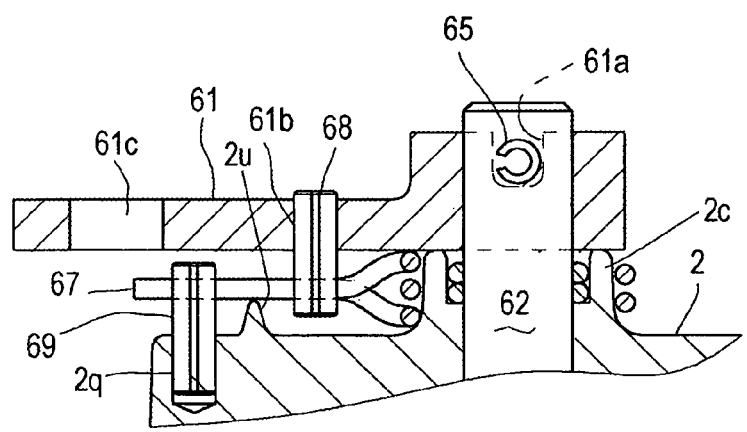

With regard to the embodiment shown in FIGS. 11 (a) and (b), a spring 67 biasing the brake arm 61 to the brake-off position is disposed out of the transaxle housing 1. Namely, the spring 67 is wound around the upward projecting boss part 2c pivotaly supporting the brake cam shaft 62 of the upper housing element 2 just below the boss part of the brake arm 61, and both ends of the spring 67 cross mutually and extend in parallel to the brake arm 61. A pin 68 is inserted into a pin hole 61b of the brake arm 61 projectingly downward. A pin 69 is inserted into the pin hole 2q of the upper housing element 2 projectingly upward, and the upper end of the pin 69 is lower than the bottom surface of the brake arm 61. When the brake arm 61 is at the brake-off position, the extended ends of the spring 67 disposed just below the brake arm 61 pinch the pins 68 and 69. Furthermore, a guide projection 2u, which is substantially circular arc-shaped centering on the center point of the brake cam shaft 62 when viewed in plan, is formed integrally with the upper housing element 2 projectingly upward. The guide projection 2u supports the extended ends of the spring 67 upward, and guides the slide of one of the ends when one of the ends is pressed and rotated by the pin 68.

When the brake arm 61 is rotated from the off-position to the brake-on position, the pin 68 rotated together with the brake arm 61 spreads one of the ends of the spring 67 so as to make distant from the other end fixed by the pin 69. Accordingly, biasing force is generated on the spring 67 so as to return the brake arm 61 and the brake cam shaft 62 to the brake-off position. When the brake arm 61 at the brake-on position is released from the operating force, by the biasing force of the spring 67, the brake arm 61 automatically returns to the brake-off position, that is, the state that both ends of the spring 67 pinch the pins 68 and 69. With regard to this embodiment, regardless of whether the brake-on position of the brake arm 61 is set to either of opposite directions against the off-position, the brake-off position is determined by fixing one of the ends of the spring 67 by the pin 68 inserted into the pin hole 61b of the brake arm 61. Furthermore, the upwardly projecting semicircular rib 2u is formed on the housing so as to prevent the extended part of the spring 67 from removing from the pins 68 and 69.

As shown in FIGS. 2 and 7 to 9, in the gear chamber, a counter shaft 42 is spanned horizontally in parallel to the motor shaft 33 and the axles 4, and a small diameter counter gear 44 is provided circularly around the counter shaft 42 so as to be rotatable relatively. The small diameter counter gear 44 extends along the axis of the counter shaft 42. One of lateral sides of the small diameter counter gear 44 is engaged with an inner perimeter of a large diameter counter gear 43, which engages with the motor gear 41, so as not to rotatable relatively, and the other end of the small diameter counter gear 44 is engaged with a bull gear 51 of the differential gear mechanism 50. As shown in FIGS. 2, 7, 9 and 12 (a), between the bull gear 51 and the large diameter counter gear 43, a spacer ring 45 is engaged with the small diameter counter gear 44 so that the bull gear 51 and the large diameter counter gear 43 is prevented from approaching mutually on the axial direction of the counter shaft 42. Furthermore, as discussed later, a collar 47 is circularly provided around the counter shaft 42 between one of ends of the small diameter counter gear 44 and the inner side surface of the outer wall of the lower housing element 3 supporting each end of the counter shaft 42, and between the other end of the small diameter counter gear 44 and the inner side surface of the vertical plate part 3b of the lower housing element 3, thereby suppressing the movement of the small diameter counter gear 44, the large diameter counter gear 43 and the bull gear 51 along the axis of the counter shaft 42.

In the differential gear mechanism 50, as shown in FIG. 2, the inner ends of the left and right axles 4 are inserted into the center hole of the bull gear 51 rotatably relatively, and differential side gears 53 are respectively fixed on the axles 4 near the left and right sides of the bull gear 51. As shown in FIG. 9, differential pinions 52 are pivotally supported on the bull gear 51, and the differential pinions 52 engage respectively with the left and right differential side gears 53. As shown in FIGS. 2 and 8, a spacer 54 is circularly provided around each of the axles 4 between the lateral outer end of the differential side gear 53 and the lateral inner end of the axle support part 2d or 3a.

Next, explanation will be given on the pivotal support construction of the motor shaft 33, the axles 4 and the counter shaft 42 according to FIGS. 2, 5, 7, 8, 12 (a) and 12 (b). Firstly, with regard to the axles 4 as the above mentioned, each of the axles 4 is pivotally supported near the lateral outer side of the differential side gear 53 by the bush 15, which is sandwiched between the axle support part 2d of the upper housing element 2 and the axle support part 3a of the lower housing element 3. As shown in FIG. 8, a notch 3d of the axle support part 3a, with which the lower half of the bush 15 is inserted, is accurately semicircular so as to adhere exactly to the outer peripheral surface of the lower half. On the other hand, a notch 2f of the axle support part 2d, with which the lower half of the bush 15 is inserted, is not semicircular accurately, and the distance between the lower end edges of the notch 2f is slightly longer than the outside diameter of the bush 15, whereby the notch 2f is formed to be slightly expanded longitudinally. Therefore, the axis of each of the left and right axles 4 is accurately determined against the lower housing element 3, and then, the longitudinal gap of the position of the upper housing element 2 can be permitted at the time of joining the upper housing element 2 to the lower housing element 3.

Next, with regard to the motor shaft 33 as the above mentioned, the bearing 90, which pivotally supports the motor shaft 33, is sandwiched between the upper and lower vertical plate parts 2e and 3b of the upper and lower housing elements 2 and 3. Similarly to the above-mentioned notches 2f ad 3d of the axle support parts 2d and 3a, a notch 3e of the vertical plate part 3b with which the lower half of the bearing 90 is inserted, is accurately semicircular so as to adhere exactly to the outer peripheral surface of the lower half. On the other hand, a notch 2g of the vertical plate part 2e, with which the lower half of the bearing 90 is inserted, is not semicircular accurately, and the distance between the lower end edges of the notch 2g is slightly longer than the outside diameter of the bearing 90, whereby the notch 2g is formed to be slightly expanded longitudinally (perpendicularly to the shafts 33, 42 and the axles 4). Therefore, the axis of the motor shaft 33 is accurately determined against the lower housing element 3, and then, the longitudinal gap of the position of the upper housing element 2 can be permitted at the time of joining the upper housing element 2 to the lower housing element 3.

Figure 12A:
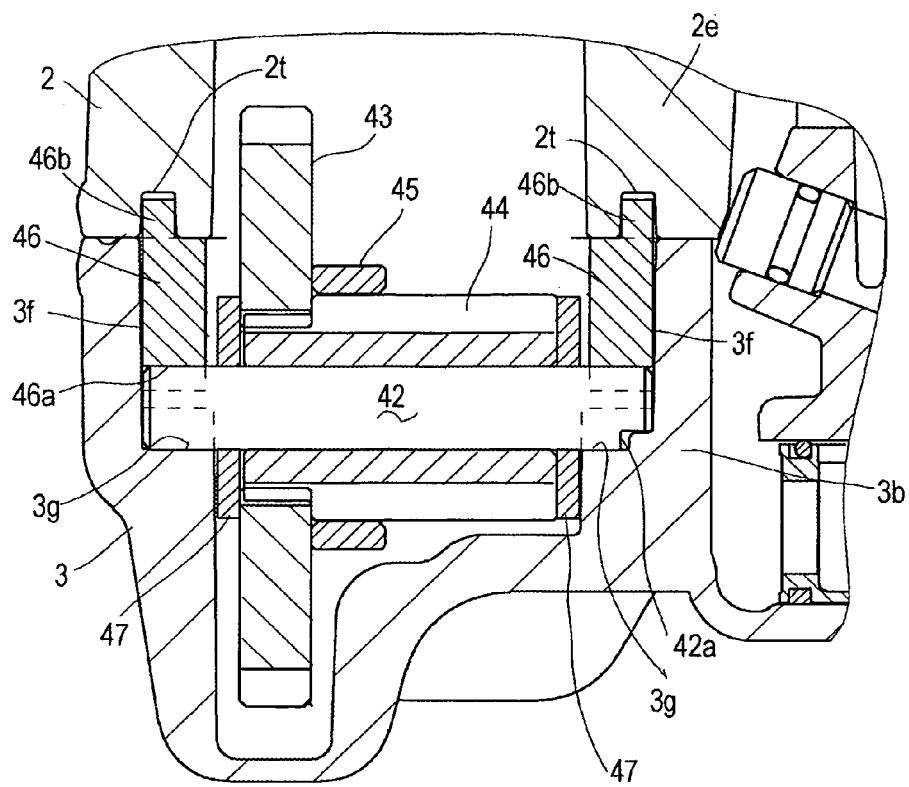
FIG. 12 (*a*) is an enlarged fragmentary sectional front view of the transaxle A, showing the pivotal support construction for the counter shaft 42, and FIG. 12 (*b*) is a perspective view of a leg member 46 for determining the position of the counter shaft shown in FIG. 7 and FIG. 12 (*a*).
Figure 12B:
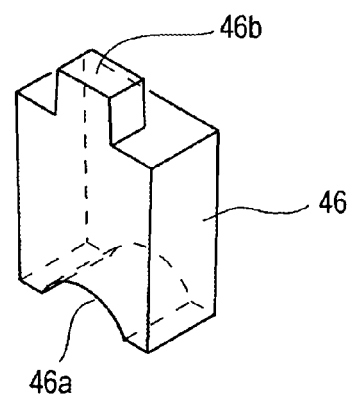

As shown in FIGS. 8 and 9, the counter shaft 42 is disposed lower than the motor shaft 33 and the axles 4. As shown in FIGS. 7, 8 and 12 (a), notches 3f, which open upward and are square when viewed from the axial direction, are formed respectively on the inner side of the outer wall of the lower housing element 3 and the vertical plate part 3b of the lower housing element 3. Furthermore, notches 3g, which are semicircular when viewed from the axial direction, are formed below the bottom of the square notches 3f. Each of the semicircular notches 3g is engaged with the lower half of each of the ends of the counter shaft 42. The semicircular notches 3g are formed to be semicircular accurately so as to adhere to the outer peripheral surfaces of the ends of the counter shaft 42.

As shown in FIGS. 8 and 12 (a), each of the end surfaces of the counter shaft 42 is disposed along the vertical surface of each of the square notches 3f so as to prevent the counter shaft 42 from moving axially. A step is formed at the lower end of the notch 3g of the vertical plate part 3b so as to be engaged with a step 42a formed at the lower end of the counter shaft 42 engaged with this semicircular notch 3g. Accordingly, the detent of the counter shaft 42 is constructed.

A leg member 46 shown in FIG. 12 (b) is inserted downward into each of the square notches 3f as shown in FIGS. 9 and 12 (a), and a circular arc notch 46a provided at the lower end of the leg member 46 abuts against the upper peripheral surface of the counter shaft 42 engaged with this semicircular notch 3g. The circular arc notch 46a does not cover the entire peripheral surface of the counter shaft 42 projected upward from the notch 3g but is formed shallow to some degree so that the lower end of the leg member 46 is disposed upper to some degree than the lower end of the notch 3f. When the upper housing element 2 is joined with the lower housing element 3, an upper end projection part 46b of the leg member 46 is inserted into a notch 2t formed at the lower end of the vertical plate part 2e of the upper housing element 2, whereby the leg member 46 is fixed to the upper and lower housing elements 2 and 3.

The peripheral edge of the leg member 46 is separated to some degree from the inner edges of the notches 3f and 2t so that the leg member 46 is movable to some degree centering on the axis of the counter shaft 42, whereby the longitudinal (perpendicular to the axles 4) gap of position of the joined upper housing element 2 against the lower housing element 3 can be absorbed.

Accordingly, similarly to the axles 4 and the motor shaft 33 engaged with the notches 3d and 3e, the counter shaft 42 is engaged its lower portion with the notches 3g, which is formed in the lower housing element 3 and is semicircular when viewed in section, so as to align its axis. The axles 4 and the motor shaft 33 are held their upper portions by the upper housing element 2. However, since the counter shaft 42 is positioned lower than the axles 4 and the motor shaft 33, the leg members 46 are interposed between the upper housing element 2 and the lower housing element 3 so as to hold the upper portion of the counter shaft 42.

Figure 13A:
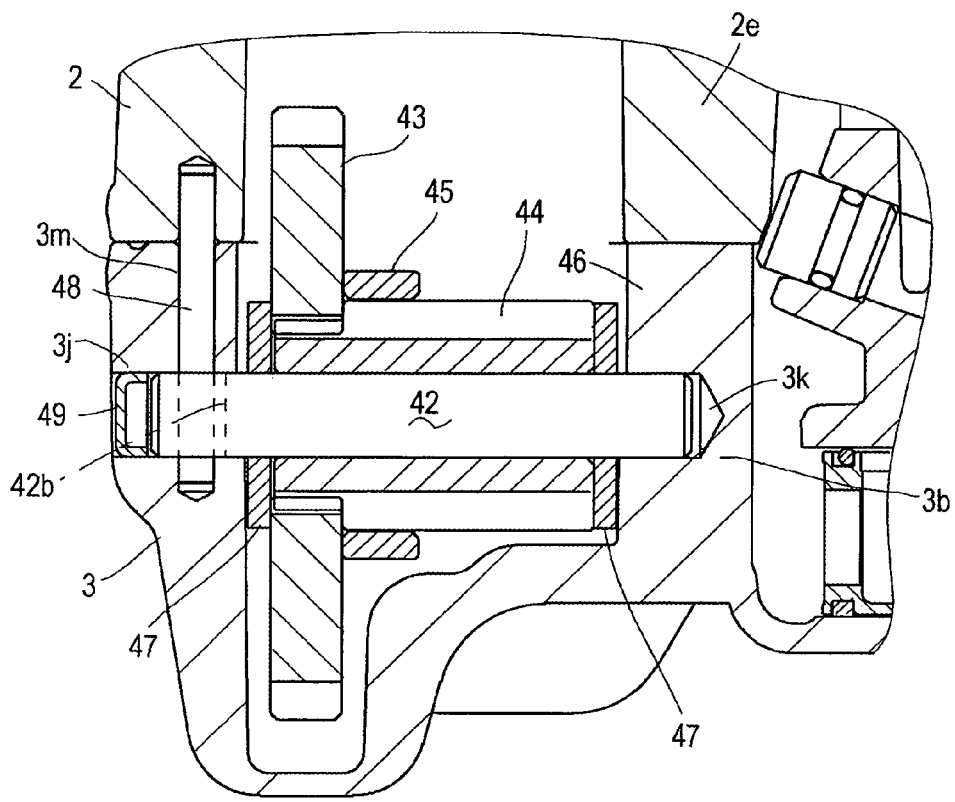
FIG. 13 (*a*) is an enlarged fragmentary sectional front view of the transaxle A, showing another pivotal support construction for the counter shaft 42, and FIG. 13 (*b*) is an enlarged fragmentary sectional side view of the transaxle A, showing a member for determining a position of the counter shaft shown in FIG. 13 (*a*).
Figure 13B:
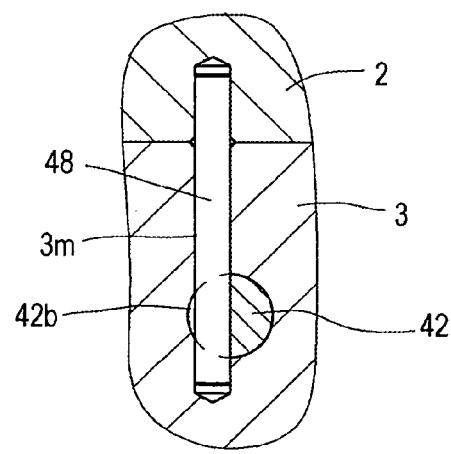

Explanation will be given on another embodiment concerning the support construction of the counter shaft 42 according to FIGS. 13 (a) and (b). With regard to the above-mentioned embodiment using the leg members 46, the counter shaft 42 is sandwiched between the notches 3g formed in the lower housing element 3 and the circular arc notches 46a of the leg members 46. On the other hand, with regard to the counter shaft 42 in FIGS. 13 (a) and (b), one of ends of the counter shaft 42 at the side of the outer wall of the lower housing element 3 is supported in a through hole 3j opened outward. Also, the other end of the counter shaft 42 at the side of the vertical plate part 3b is supported by a recess 3k bored along the axis of the counter shaft 42. Accordingly, the counter shaft 42 passes through the through hole 3j and is inserted into the recess 3k so as to be attached to the lower housing element 3 axially, that is, laterally horizontally.

In addition, after disposing the counter shaft 42 at the prescribed position, the outer end opening of the through hole 3j is plugged by an oil leakage prevention plug 49. With regard to this embodiment, in the through hole 3j, the counter shaft 42 has a notch 42b semicircular when viewed from the axial direction, and a vertical axial hole 3m is bored in the outer wall of the lower housing element 3 so as to passes through the notch 42b. The axial hole 3m opens upward, and a stopper pin 48 is inserted into the axial hole 3m before joining the upper housing element 2 to the lower housing element 3 so as to pass through the notch 42b, whereby the detent and stopper of the counter shaft 42 against the lower housing element 3 is constructed.

Figure 14A:
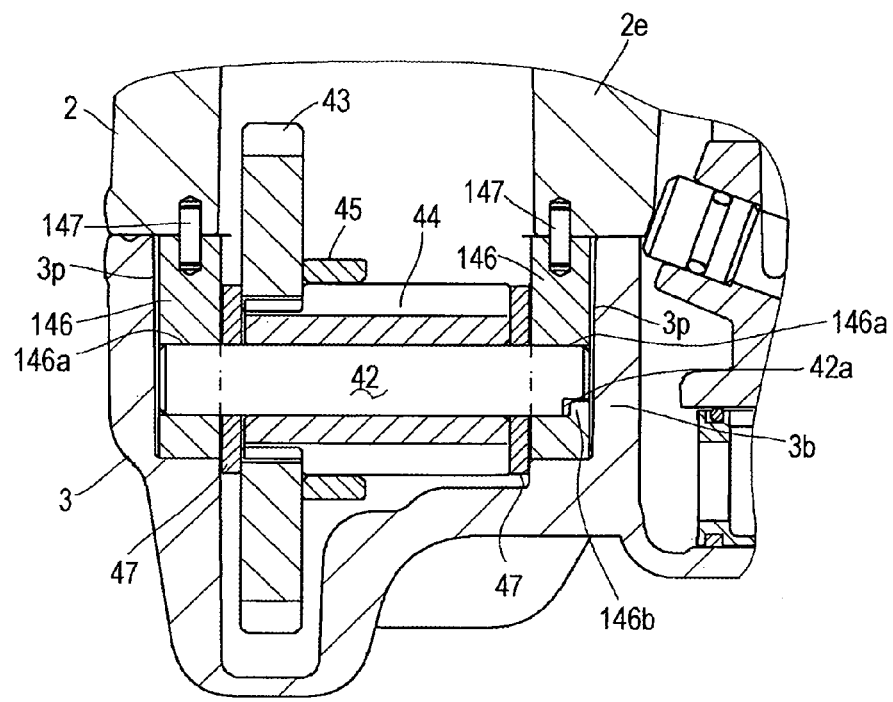
FIG. 14 (*a*) is an enlarged fragmentary sectional front view of the transaxle A, showing another pivotal support construction for the counter shaft 42, and FIG. 14 (*b*) is an enlarge fragmentary sectional front view of the transaxle A, showing another member for determining a position of the counter shaft shown in FIG. 14 (*a*).
Figure 14B:
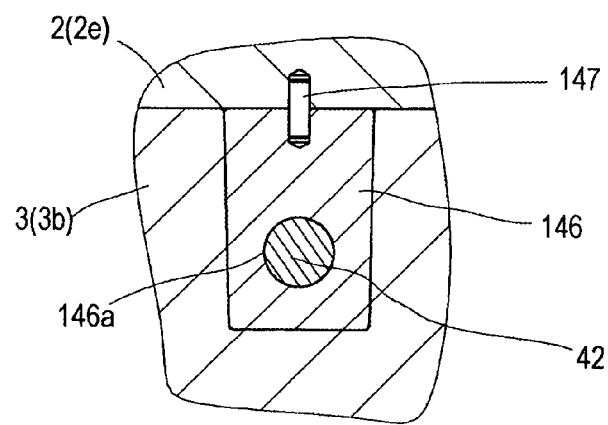

Explanation will be given on further another embodiment concerning the support construction of the counter shaft 42 according to FIGS. 14 (a) and (b). With regard to the above-mentioned embodiment using the leg members 46, the counter shaft 42 is sandwiched between the leg members 46 and the lower housing element 3. On the other hand, with regard to this embodiment, each end of the counter shaft 42 is axially inserted into a horizontal axial hole 146a of a leg member 146 inserted and adhering to a downward recess 3p, which is formed on each of the outer wall and the vertical plate part 3b of the lower housing element 3. The axial hole 146a is formed circularly accurately so as to touch the entire peripheral surface of the counter shaft 42. The step 42a similar to that shown in FIG. 12 (a) is formed at the end of the counter shaft 42 and is engaged with a step 146b formed on one of the leg members 146, thereby constructing the detent.

The upper end of one of the leg members 146 is engaged with the lower end of the vertical plate part 2e of the upper housing element 2 through a position determination pin 147, whereby the leg members 146 is engaged with the upper housing element 2 so as not to movable relatively. The leg member 146 is engaged with the lower housing element 3 adhesively, that is, so as not to movable relatively, and the counter shaft 42 is engaged with the leg members 146 adhesively, that is, so as not to movable relatively, therefore the position relation between the upper housing element 2, which is engaged with the leg members 146 as the above, and the lower housing element 3 is demarcated strictly through the position determination pin 147.

Accordingly, with regard to this embodiment, not the engagement parts for the counter shaft 42 but the engagement parts for the leg members 146 pivotally supporting the counter shaft 42 are provided in the lower housing element 3. When it is required to change the distance between the counter shaft 42 and the motor shaft 33 so as to change the gear ratio of the deceleration gear train 40, what is necessary is just to change the position of the axial holes 146a of the leg members 146, which is cheap and easy to be processed, whereby there is no necessity of changing the processing of the lower housing element 3. Therefore, the upper and lower housing elements 2 and 3 are applicable commonly to any transaxle A having a deceleration gear train 40 with different gear ratio.

It is further understood that the foregoing description is a preferred embodiment of the disclosed apparatus and that various changes and modifications of the detail construction, disposition and arrangement of parts may be made in the invention without departing from the following claims.

What is claimed is:

1. A transaxle comprising:
   a hydrostatic stepless transmission including mutually fluidly connected hydraulic pump and motor;
   an axle drivingly connected to the hydrostatic stepless transmission;
   a housing incorporating the hydrostatic stepless transmission and the axle, the housing including first and second divisional housing elements joined to each other through a joint surface in parallel to the lengthwise direction of the axle;
   a counter shaft interposed between the hydrostatic stepless transmission and the axle in the housing, the counter shaft having an axis located in the first housing element; and
   a leg member contacting the first housing element, wherein one end of the leg member is engaged with a part of the counter shaft, and another end of the leg member immovably contacts the second housing element.

2. The transaxle as set forth in claim 1, the hydraulic motor including a motor shaft, wherein the motor shaft and the axle are supported so as to have axes of the motor shaft and the axle located by the first housing element, and wherein the first housing element defines a distance between the counter shaft and the motor shaft and a distance between the counter shaft and the axle.

3. A transaxle comprising:
   a housing;
   a hydrostatic stepless transmission disposed in the housing, the hydrostatic stepless transmission including a component element;
   an axle disposed in the housing and drivingly connected to the hydrostatic stepless transmission; and
   an oil filter immovably sandwiched between the component of the hydrostatic stepless transmission and an inner surface of the housing, the oil filter including:
      an edge part that defines a first opening facing the component element of the hydrostatic stepless transmission,
      a groove formed at the edge part of the oil filter around the first opening so as to face in the same direction as the first opening, wherein a seal member is engaged into the groove so as to be interposed between the oil filter and the component element of the hydrostatic stepless transmission, and
      wherein a peripheral surface of the oil filter defines a second opening, wherein the second opening is covered with a net.

4. The transaxle as set forth in claim 3, the oil filter further including:
   another edge part that defines a third opening facing the inner surface of the housing; and
   a second groove formed at the edge part around the third opening, wherein a seal member is engaged into the second groove so as to be interposed between the inner surface of the housing and the oil filter.

5. The transaxle as set forth in claim 4, the oil filter further including a plurality of strut parts that extend between the edge parts of the first and third openings.

6. The transaxle as set forth in claim 5, wherein the groove of the oil filter and the second groove of the oil filter are ring-shaped and extend horizontally around the respective first and third openings, and wherein the strut parts extend vertically between the edge parts of the first and third openings.

7. The transaxle as set forth in claim 5, wherein the strut parts divide the second opening into a plurality of openings, each of which is disposed between the adjoining strut parts along the peripheral surface of the oil filter and covered with the net.

8. The transaxle as set forth in claim 3, wherein the oil filter is cylindrically shaped.

9. The transaxle as set forth in claim 3, wherein the groove of the oil filter is formed at an upper surface of the edge part around the first opening so as to face a bottom surface of the component element.

10. A transaxle comprising:
a housing;
a hydrostatic stepless transmission disposed in the housing;
an axle disposed in the housing and drivingly connected to the hydrostatic stepless transmission;
a brake disposed in the housing so as to brake the axle;
an arm rotatably supported by the housing so as to operate the brake, wherein the brake is turned into a braking state by setting the arm to a braking position, and wherein the brake is released by setting the arm to a braking-off position;
a first stopper for holding the arm at the braking-off position, wherein the housing is provided thereon with two positions for attachment of the first stopper, wherein one of the two positions is selected for attaching the first stopper to the housing depending upon which of opposite directions is selected for rotating the arm from the braking-off position to the braking position.

11. The transaxle as set forth in claim 10, further comprising:
a torsion spring for biasing the arm disposed at the braking position toward the braking-off position, wherein one of ends of the torsion spring is fixed to the first stopper attached to the housing; and
a second stopper attached to the arm, wherein the other end of the torsion spring is fixed to the second stopper.

* * * * *